United States Patent
Benayon et al.

(10) Patent No.: US 8,711,142 B2
(45) Date of Patent: Apr. 29, 2014

(54) VISUAL MODEL IMPORTATION

(75) Inventors: Jay W. Benayon, Thornhill (CA); Pablo Daniel Irassar, Markham (CA); Humie Leung, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1702 days.

(21) Appl. No.: 11/201,611

(22) Filed: Aug. 11, 2005

(65) Prior Publication Data
US 2007/0035558 A1 Feb. 15, 2007

(51) Int. Cl.
*G06T 17/00* (2006.01)
*G06T 17/20* (2006.01)
*G06T 19/00* (2011.01)
*G06T 15/40* (2011.01)

(52) U.S. Cl.
CPC ................ *G06T 17/20* (2013.01); *G06T 19/00* (2013.01); *G06T 15/40* (2013.01)
USPC ........... 345/420; 345/418; 345/419; 345/421; 345/422; 345/423; 345/424; 345/426; 345/427

(58) Field of Classification Search
CPC .......... G06T 17/20; G06T 19/20; G06T 15/40
USPC .............. 345/619, 418–424, 426, 427; 707/1, 707/101–104
See application file for complete search history.

(56) References Cited

U.S. PATENT DOCUMENTS

| | | | | |
|---|---|---|---|---|
| 6,028,997 A | * | 2/2000 | Leymann et al. | 717/104 |
| 7,191,186 B1 | * | 3/2007 | Pullen | 707/102 |
| 2002/0103822 A1 | | 8/2002 | Miller | |
| 2004/0215586 A1 | * | 10/2004 | Koono et al. | 706/45 |
| 2004/0221265 A1 | | 11/2004 | Leung et al. | |
| 2005/0026685 A1 | | 2/2005 | Ruark et al. | |
| 2005/0027681 A1 | * | 2/2005 | Bernstein et al. | 707/1 |

OTHER PUBLICATIONS

Business Process Management Initiative (BPMI), Version 1.0, May 3, 2004, pp. 1-296.*

* cited by examiner

*Primary Examiner* — Jin-Cheng Wang
(74) *Attorney, Agent, or Firm* — Steven M. Greenberg, Esq.; CRGO Law

(57) ABSTRACT

Embodiments of the present invention address deficiencies of the art with respect to modeling a process having a visual representation and provide a method, system and computer program product for importing a visual representation of a process for use in an application. In one embodiment, a computer-implemented visual process model importation method can include identifying an arrangement of one or more visual objects in a visual process model, selecting associations between the visual objects and corresponding representative elements for a target process model, mapping the visual objects in the source model into the selected corresponding representative elements for the target process model, and producing the target process model for the visual process model using the mapping. The method subsequently can include providing the target process model as input to an application such as a simulation engine, a workflow engine or a visual collaboration and documentation system.

21 Claims, 4 Drawing Sheets

VISUAL MODEL IMPORTATION

BACKGROUND OF THE INVENTION

1. Field of the Invention

The present invention relates to the field of process modeling and more particularly to importing a visually specified process model.

2. Description of the Related Art

Process modeling relates to the modeling of dynamic or static systems. A dynamic system is an entity which can be described in terms of input, output and state. A static system is an entity having a constant state irrespective of input and output. Dynamic and static systems include, but are not limited to, enterprise management systems, engineering systems, networked information technology systems, utility systems, utility computing systems, autonomic computing systems, on-demand systems, electric power grids, biological systems, medical systems, weather systems, financial market systems, and business process systems. Such systems can be modeled for a variety of purposes including monitoring, analysis, control, design, simulation, and management.

A model is an abstract description of a process such as a business process or any other process related to the lifecycle of a system. The abstract description of the model can include sufficient detail required by a simulation engine for exercising the process model with one or more scenarios to determine a likely outcome. Models generally specify one or more tasks or activities of a process and the relationship between the different tasks or activities. As part of the model, one or more events or conditions leading to the transition from one task or activity to the next can be specified. Models generally are expressed according to a specific format. Exemplary formats include Activity Decision Flow (ADF), Business Object Model (BOM), and the Business Process Execution Language (BPEL), to name only a few.

While a process generally is known to be represented in one of several textual formats, the visual representation of a process model often arises—particularly where a flow chart can be of value in describing a process or workflow. In many cases, ordinary drawing software can be used to model a process. The visual modeling of a process can provide a marked advantage over more traditional model formatting methodologies. First, inexperienced modelers can rapidly produce a visual model simply through an understanding of the modeled process itself. Second, complex multi-role, multi-location flows can be readily understood in a visual model where portions of the visual model are clearly demarcated according to actor and location.

Despite the advantages of a visual process model, model manipulating applications including simulation engines are not always pre-configured to handle a visual model in a particular format. Rather, many applications only import process models formatted in a textual manner such as a delimited text file. Where visual process models can be imported, the shapes of the visual process model are pre-configured to map to pre-determined process elements in a target process model. In most cases, the pre-determined process elements are hidden from view from the user, and the mapping can never be dynamically modified to accommodate the varying needs of the end user. Finally, while groupings of shapes in the visual process model can represent a set of activities to be performed in association with a particular role, location, resource, or other categorization, these groupings do not carry forward into the target process model leaving the target process model with a translated arrangement of visual objects lacking semantics and defined structure.

BRIEF SUMMARY OF THE INVENTION

Embodiments of the present invention address deficiencies of the art with respect to modeling a process having a visual representation and provide a novel and non-obvious method, system and computer program product for importing a visual representation of a process. In one embodiment, a computer-implemented visual process model importation method can include identifying an arrangement of one or more visual objects in a visual process model, selecting associations between the visual objects and corresponding representative elements for a target process model, mapping the visual objects in the source model into corresponding representative elements for the target process model, and producing the target process model for the visual process model using the mapping. The method subsequently can include providing the target process model as input to a simulation engine.

Identifying an arrangement of the visual objects in a visual process model can include generating a source model representing the arrangement of the visual objects. For example, generating a source model representing the arrangement of the visual objects can include locating a shape within the visual process model and determining a connection between the located shape and another shape in the visual process model. An instance of a visual object can be created for the located shape and an instance of a connection for the determined connection further can be created. Finally, the created instance and the further created instance can be associated with an instance of a visual object corresponding to the other shape in the visual process model. Each of the locating, determining, creating and further creating can be repeated for every visual object in the visual process model to produce the source model. Optionally, one or more groupings of the visual objects can be identified which are separately categorizable from other groupings of the visual objects in the visual process model. Once identified, each grouping can be mapped into a swimlane for the target process model.

Notably, mapping the visual objects in the source model into corresponding representative elements for a target process model can include rendering a visual selection of source shapes in the visual process model, further rendering a visual selection of target shapes for the target process model, and matching individual ones of the source shapes with individual ones of the target shapes to produce the mapping. Similarly, mapping the identified grouping into a swimlane for the target process model can include rendering a textual selection of identified groupings of visual objects in the visual process model, further rendering a textual selection of categories, and matching individual ones of the identified groupings with individual ones of the categories to produce individual swimlanes for the target process model.

In another embodiment, a data processing system configured for importing a visual process model into a target process model in an application can include a mapper including program code enabled to map visual objects located within a source model for the visual process model to process elements defined for the target process model. The data processing system further can include an importer including program code enabled to import mapped ones of the visual objects into the target process model. The mapper further can include program code enabled to map groupings of the visual objects to categories to produce swimlanes for the target process model.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for importing a visual process model into a data processing system. In accordance with an embodiment of the present invention, visual objects within a visual process model can be identified and transformed into programmatic objects within a source model. The visual objects in the source model can be mapped to corresponding target process model representations. Optionally, groupings of the visual objects in the visual process model can be identified and corresponding target process model representations can be organized into swimlanes. Finally, the target process model representations can be imported into a model manipulating application such as a simulation data processing system, a workflow engine or a visual collaboration and documentation system, in order to simulate the visual process model.

Figure 1:
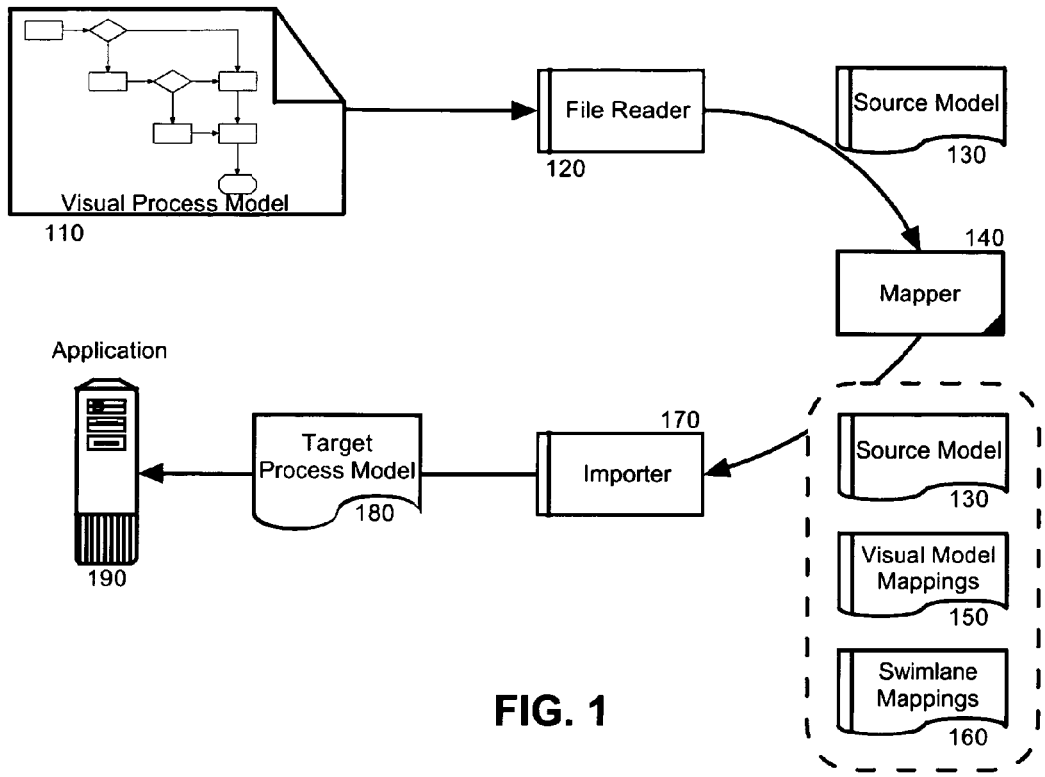
FIG. 1 is a schematic illustration of a data processing system configured to import a visual process model.

In further illustration, FIG. 1 is a schematic illustration of a data processing system configured to import a visual process model. As shown in FIG. 1, the data processing system can include an application 190 configured to utilize a target process model 180. The system further can include an importer 170 configured to import a source model 130 into the target process model 180 able to be utilized within the application 190. Additionally, the importer 170 can utilize visual model mappings 150, and optionally, swimlane mappings 160, each produced by a mapper 140 to facilitate the importation of the source model 130 based upon visual process model 110. Finally, a file reader 120 can be provided to produce the source model 130 based upon the visual objects of the visual process model 110.

Figure 2:
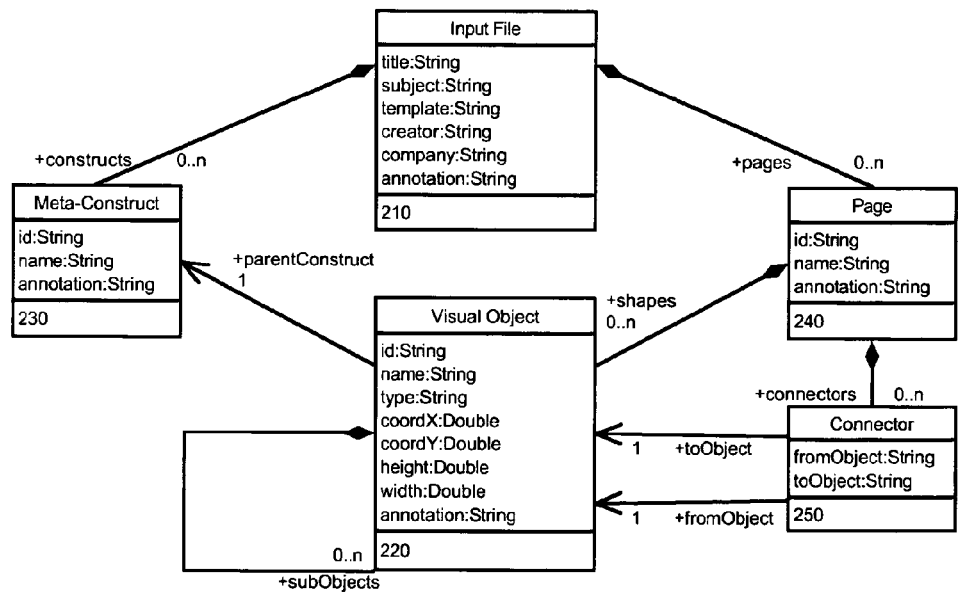
FIG. 2 is a class diagram of a source model arrangement for a visual process model defined within an input file for the data processing system of FIG. 1.

In operation, a visual process model 110 can be provided to a file reader 120 which can process the visual process model 110 to identify the various visual objects and their respective connections which define the visual process model 110. The file reader 120 can produce a source model 130 based upon the identified visual objects and the respective connections between the visual objects. Specifically, referring to FIG. 2, a class diagram is shown of a representative arrangement of the source model 130 for the visual process model 110 of FIG. 1.

In the illustrative arrangement, an instance of an input file 210 can include an aggregation of instances of a page 240 and instances of a meta-construct 230 for one or more instances of a visual object 220. Each instance of a page 240 can include an aggregation of shapes defined by instances of the visual object 220. Moreover, an instance of a visual object 220 can be an aggregation of other instances of the visual object 220. Finally, different instances of the visual object 220 can be coupled together to model a process through the use of instances of a connector 250. Each instance of a connector 250 can indicate a direction such as a connection to an instance of a visual object 220, or a connection from an instance of a visual object 220.

Returning to FIG. 1, the source model 130 can be provided to a mapper 140. The mapper 140 can produce visual object mappings 150 of the visual objects of the visual process model 110 as represented within the source model 130, to process element constructs which can be imported into the application 190. Optionally, groupings of the visual objects of the visual process model 110, as represented within the source model 130 can be mapped within swimlane mappings 160 which can be imported into the application 190. Finally, each of the source model 130, visual model mappings 150 and swimlane mappings 160 can be processed by the importer 170 into a target process model 180 able to be utilized by the application 190.

Figure 3:
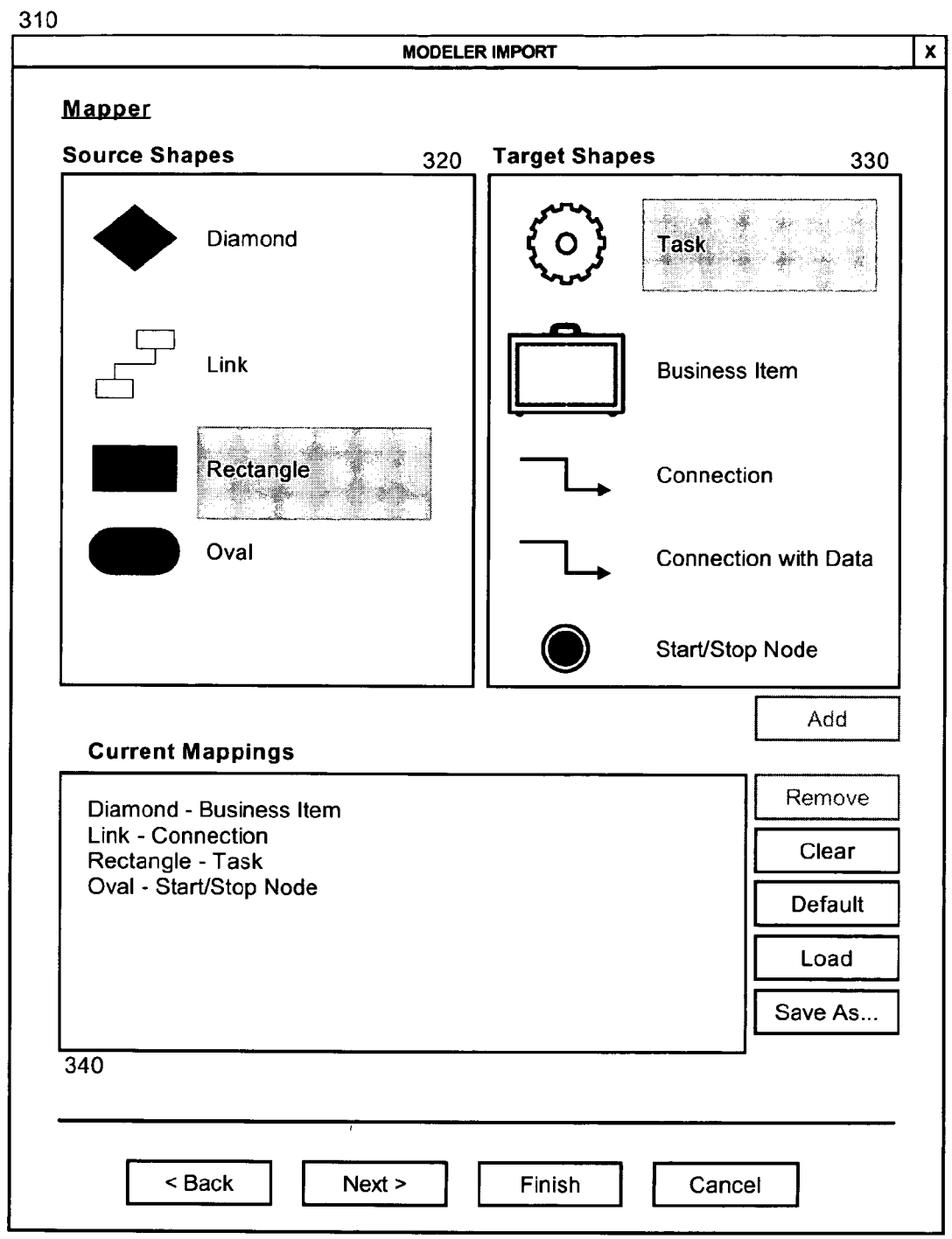
FIG. 3 is a screen shot illustration of a wizard configured for mapping visual object shapes in a source model to corresponding target process model representations.

To facilitate the production of the visual model mappings 150, a user interface wizard can be provided to permit an end-user to specify a one-to-one mapping of visual objects in a source model 130 to process elements in a process model 180. For example, in FIG. 3, a screen shot is shown which illustrates a wizard configured for mapping visual object shapes in a source model to corresponding target process model representations. As shown in FIG. 3, a visual object mapping wizard 310 can include a visual selection of source shapes 320 identified within a source model, and a visual selection of target shapes 330 available for use in the target process model. An end user can select a shape in each of the visual selections 320, 330 in order to create a mapping. The selected mappings can be visually indicated within user interface display element 340. When the end user has completed the mapping of all identified source shapes in the source model to target shapes in the target visual model, the mappings can be written to the visual model mappings.

Optionally, groupings of visual objects in a visual model can be identified for inclusion in swimlanes for a target process model. Specifically, groupings of visual objects in a visual process model can be identified and represented in a target process model as user-defined, separated regions that group activities into user defined categories such as roles, resources, organizations, or locations, to name a few. For instance, FIG. 4 is a screen shot illustration of a wizard configured for mapping groupings of object shapes in a source model to corresponding swimlanes in a target process model.

Figure 4:
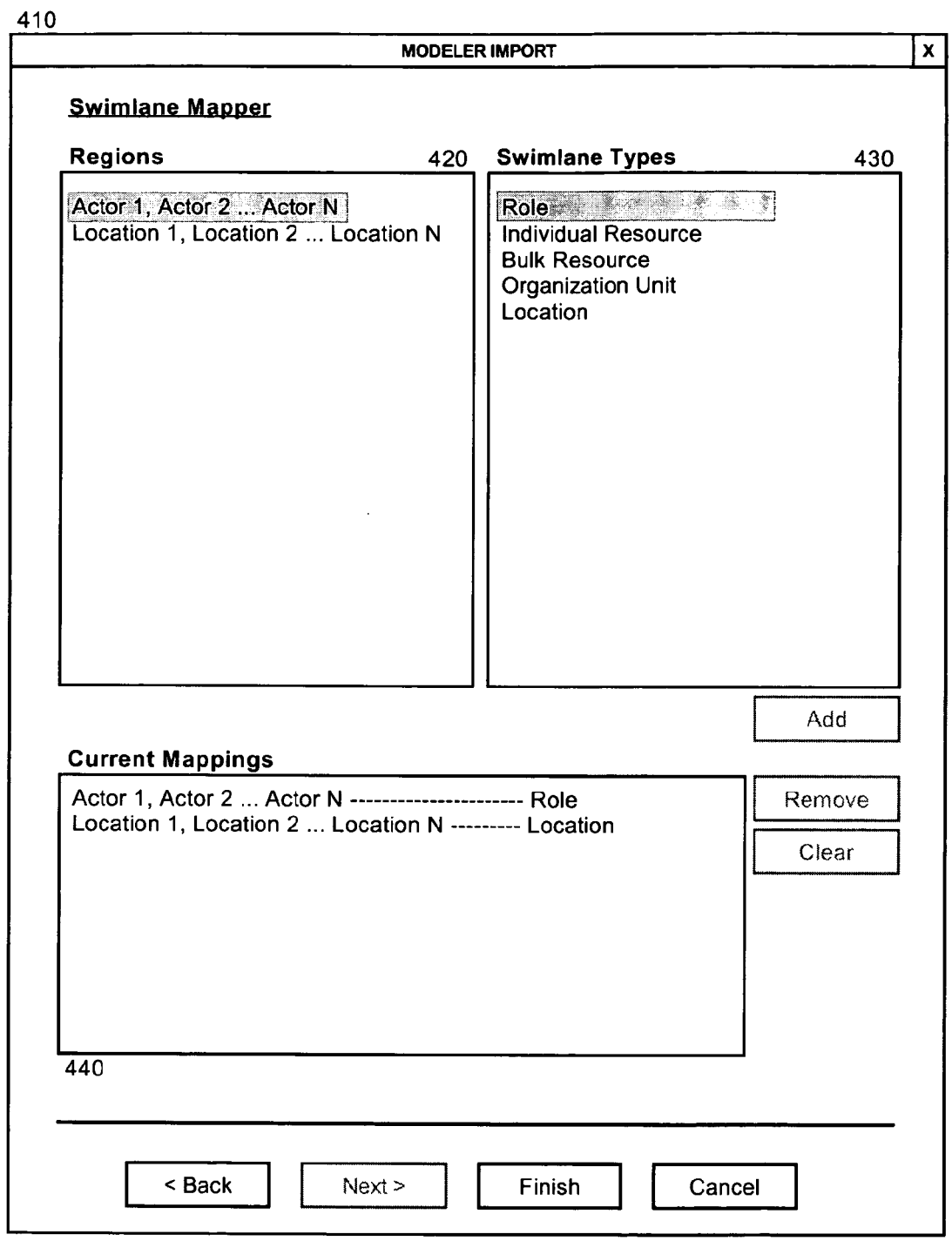
FIG. 4 is a screen shot illustration of a wizard configured for mapping groupings of object shapes in a source model to corresponding swimlanes in a target process model; and, FIG. 5 is a flow chart illustrating a process for importing a visual process model into a data processing system.

As shown in FIG. 4, a swimlane mapping wizard 410 can include a textual selection of source regions 420 specified within a source model, and a textual selection of target swimlane types 430 available for use in the target process model. An end user can select a source region and a corresponding swimlane type in the visual selections 420, 430 in order to create a mapping. The selected mappings can be visually indicated within user interface display element 440. When the end user has completed the mapping of swimlanes, the mappings can be written to the swimlane mappings.

Figure 5:
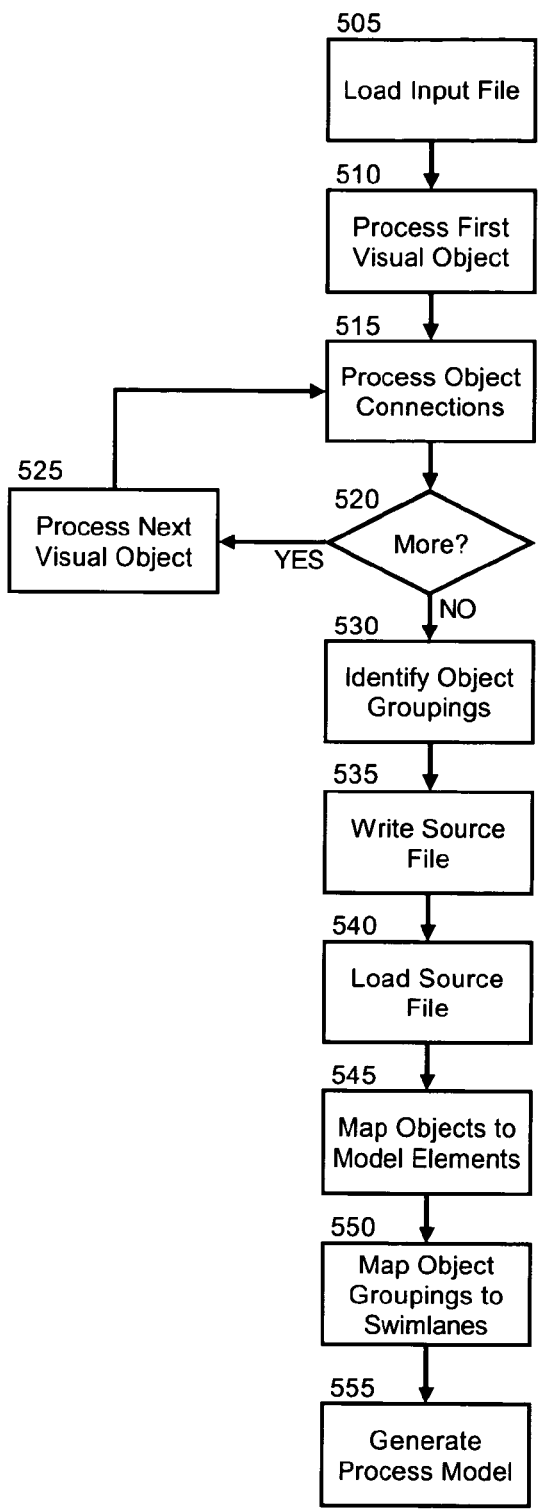

The production of the target process model from the visual process model, using an intermediate source model, visual model mapping and swimlane mapping can be summarized according to the flow chart of FIG. 5. Beginning in block 505, an input file containing the visual process model can be loaded for processing. In block 510, a first visual object in the visual process model can be identified and one or more visual object instances can be created and aggregated under a meta-construct instance to represent the identified visual object. In block 515, any object connections associated with the visual object can be identified and corresponding instances of a connector can be created and associated with the visual object instance. The process of blocks 510 and 515 can repeat in decision block 520 and block 525 for each visual object in the input file.

Once all of the visual objects in the input file have been processed, in block 530, object groupings can be identified which define a set of activities which can be categorized separately from other visual objects in the visual process model. Subsequently, in block 535 a source model can be written for the arrangement of the visual objects, and in block 540, the source model can be loaded for mapping. Specifically, in block 545, each of the visual objects of the source model can be mapped to a target process model construct such as a target shape. Likewise, in block 550 the identified object groupings can be mapped to swimlanes in the target process model. Finally, in block 555 the target process model can be generated for use in an application such as a simulation engine, a workflow engine, or a visual collaboration and documentation system.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer-implemented visual process model importation method comprising:

identifying in an importer executing in memory by a processor of a data processing system, an arrangement of a plurality of visual objects in a visual process model, the visual process model comprising a plurality of different source shapes arranged to represent a set of activities to be performed in a dynamic or static system;

selecting associations by the importer between said visual objects and corresponding representative elements for a target process model;

mapping by a mapper executing in the memory of the data processing system said visual objects in a source model into said selected corresponding representative elements for said target process model; and, producing by a file reader executing in the memory of the data processing system said target process model for said visual process model using said mapping.

2. The method of claim 1, further comprising providing said target process model as input to an application.

3. The method of claim 2, wherein said providing said target process model as input to an application, comprises providing said target process model as input to an application selected from the group consisting of a simulation engine, a workflow engine and a visual collaboration and documentation system.

4. The method of claim 1, wherein said identifying an arrangement of a plurality of visual objects in a visual process model, comprises generating a source model representing said arrangement of said visual objects.

5. The method of claim 1, wherein said generating a source model representing said arrangement of said visual objects, comprises:

locating a shape within said visual process model;

determining a connection between said located shape and another shape in said visual process model;

creating an instance of a visual object for said located shape;

further creating an instance of a connection for said determined connection, and associating said created instance and said further created instance with another instance of a visual object corresponding to said another shape in said visual process model; and, repeating each of said locating, determining, creating and further creating for every visual object in said visual process model to produce said source model.

6. The method of claim 1, further comprising:

identifying a grouping of said visual objects which are separately categorizable from other groupings of said visual objects in said visual process model; and, mapping said identified grouping into a swimlane for said target process model.

7. The method of claim 6, wherein said mapping said identified grouping into a swimlane for said target process model, comprises:

rendering a textual selection of identified groupings of visual objects in said visual process model;

further rendering a textual selection of categories; and, matching individual ones of said identified groupings with individual ones of said categories to produce individual swimlanes for said target process model.

8. The method of claim 1, wherein said mapping said visual objects in said source model into corresponding representative elements for a target process model, comprises:
rendering a visual selection of source shapes in said visual process model;
further rendering a visual selection of target shapes for said target process model; and,
matching individual ones of said source shapes with individual ones of said target shapes to produce said mapping.

9. A data processing system configured for importing a visual process model into a target process model in an application, the data processing system comprising:
a data processing system comprising a processor and memory;
a mapper executing in the memory by the processor of the data processing system, the mapper comprising program code enabled to map visual objects located within a source model for the visual process model to process elements defined for the target process model, the visual process model comprising a plurality of different source shapes arranged to represent a set of activities to be performed in a dynamic or static system; and,
an importer executing in the memory by the processor of the data processing system, the importer comprising program code enabled to import mapped ones of said visual objects into the target process model.

10. The data processing system of claim 9, wherein said mapper further comprises program code enabled to map groupings of said visual objects to categories to produce swimlanes for said target process model.

11. The data processing system of claim 10, further comprising a swimlane mapping wizard coupled to said mapper.

12. The data processing system of claim 9, further comprising a file reader executing in the memory by the processor of the data processing system, coupled to said mapper and configured to produce said source model for located ones of said visual objects from an input file for said visual process model.

13. The data processing system of claim 9, further comprising a visual object mapping wizard coupled to said mapper.

14. A computer program product comprising a computer usable medium having computer usable program code for visual process model importation, said computer program product including:
computer usable program code for identifying an arrangement of a plurality of visual objects in a visual process model, the visual process model comprising a plurality of different source shapes arranged to represent a set of activities to be performed in a dynamic or static system;
computer usable program code for selecting associations between said visual objects and corresponding representative elements for a target process model;
computer usable program code for mapping said visual objects in a source model into said selected corresponding representative elements for said target process model; and,
computer usable program code for producing said target process model for said visual process model using said mapping.

15. The computer program product of claim 14, further comprising computer usable program code for providing said target process model as input to an application.

16. The computer program product of claim 15, wherein said computer usable program code for providing said target process model as input to an application, comprises computer usable program code for providing said target process model as input to an application selected from the group consisting of a simulation engine, a workflow engine and a visual collaboration and documentation system.

17. The computer program product of claim 14, wherein said computer usable program code for identifying an arrangement of a plurality of visual objects in a visual process model, comprises computer usable program code for generating a source model representing said arrangement of said visual objects.

18. The computer program product of claim 14, wherein said computer usable program code for generating a source model representing said arrangement of said visual objects, comprises:
computer usable program code for locating a shape within said visual process model;
computer usable program code for determining a connection between said located shape and another shape in said visual process model;
computer usable program code for creating an instance of a visual object for said located shape;
computer usable program code for further creating an instance of a connection for said determined connection, and associating said created instance and said further created instance with an instance of a visual object corresponding to said another shape in said visual process model; and,
computer usable program code for repeating each of said locating, determining, creating and further creating for every visual object in said visual process model to produce said source model.

19. The computer program product of claim 14, further comprising:
computer usable program code for identifying a grouping of said visual objects which are separately categorizable from other groupings of said visual objects in said visual process model; and,
computer usable program code for mapping said identified grouping into a swimlane for said target process model.

20. The computer program product of claim 19, wherein said computer usable program code for mapping said identified grouping into a swimlane for said target process model, comprises:
computer usable program code for rendering a textual selection of identified groupings of visual objects in said visual process model;
computer usable program code for further rendering a textual selection of categories; and,
computer usable program code for matching individual ones of said identified groupings with individual ones of said categories to produce individual swimlanes for said target process model.

21. The computer program product of claim 14, wherein said computer usable program code for mapping said visual objects in said source model into corresponding representative elements for a target process model, comprises:
computer usable program code for rendering a visual selection of source shapes in said visual process model;
computer usable program code for further rendering a visual selection of target shapes for said target process model; and, computer usable program code for matching individual ones of said source shapes with individual ones of said target shapes to produce said mapping.

* * * * *